US012598621B2

(12) United States Patent (10) Patent No.: US 12,598,621 B2

Lee et al. (45) Date of Patent: Apr. 7, 2026

---

(54) DEVICE AND METHOD FOR HANDLING A MULTI-CELL SCHEDULING

(71) Applicant: ACER INCORPORATED, New Taipei City (TW)

(72) Inventors: Chien-Min Lee, New Taipei City (TW); Li-Chung Lo, New Taipei City (TW); Jen-Hsien Chen, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 496 days.

(21) Appl. No.: 18/123,331

(22) Filed: Mar. 19, 2023

(65) Prior Publication Data

US 2023/0345504 A1 Oct. 26, 2023

Related U.S. Application Data

(60) Provisional application No. 63/333,564, filed on Apr. 22, 2022.

(51) Int. Cl.
H04W 72/232 (2023.01)
H04L 5/00 (2006.01)
(Continued)

(52) U.S. Cl.
CPC ......... H04W 72/232 (2023.01); H04L 5/0053 (2013.01); H04W 72/0457 (2023.01); H04W 72/12 (2013.01)

(58) Field of Classification Search
CPC ........... H04W 72/232; H04W 72/0457; H04W 72/12; H04W 72/23; H04W 72/0446;
(Continued)

(56) References Cited

U.S. PATENT DOCUMENTS 11,706,774 B2 * 7/2023 Takeda ..................... H04L 5/001
370/329
2018/0310260 A1 * 10/2018 Takaoka ................ H04W 52/42
(Continued)

FOREIGN PATENT DOCUMENTS

KR 10-2021-0103293 A 8/2021
WO 2021/201533 A1 10/2021
WO 2022/066599 A1 3/2022

OTHER PUBLICATIONS

Qualcomm Incorporated, Views on multi-cell PDSCH scheduling via a single DCI, 3GPP TSG RAN WG1 Meeting #103-e, R1-2009278, E-meeting, Oct. 26-Nov. 13, 2020, Oct. 26, 2020.

*Primary Examiner* — Khaled M Kassim
*Assistant Examiner* — Christopher A. Reyes
(74) *Attorney, Agent, or Firm* — Winston Hsu

(57) ABSTRACT

A communication device for handling a multi-cell scheduling includes at least one storage device; and at least one processing circuit, coupled to the at least one storage device, wherein the at least one storage device stores instructions, and the at least one processing circuit is configured to execute the instructions of: receiving a downlink (DL) control information (DCI) from a network; determining a plurality of first cells for at least one communication operation from a cell set according to the DCI; and performing the at least one communication operation with the network via at least one cell of the plurality of first cells.

31 Claims, 8 Drawing Sheets

(51) Int. Cl.
H04W 72/0457 (2023.01)
H04W 72/12 (2023.01)

(58) Field of Classification Search
CPC .......... H04W 72/0453; H04W 72/1263; H04L
5/0053; H04L 5/0044; H04L 5/0035;
H04L 5/001; H04L 5/0094
See application file for complete search history.

(56) References Cited

U.S. PATENT DOCUMENTS

| | | | | |
|---|---|---|---|---|
| 2021/0219195 A1* | 7/2021 | Zhang | H04W 76/11 |
| 2021/0274535 A1* | 9/2021 | Yi | H04W 72/0446 |
| 2022/0078768 A1* | 3/2022 | El Hamss | H04L 1/1812 |
| 2022/0086894 A1* | 3/2022 | Papasakellariou | H04L 5/0053 |
| 2022/0174601 A1* | 6/2022 | Chen | H04W 72/23 |
| 2022/0232478 A1* | 7/2022 | Huang | H04W 52/028 |
| 2022/0400414 A1* | 12/2022 | Bergström | H04W 48/10 |
| 2023/0072342 A1* | 3/2023 | Wang | H04W 72/23 |
| 2023/0087223 A1* | 3/2023 | Jang | H04L 1/1896 |
| | | | 370/329 |
| 2023/0217456 A1* | 7/2023 | Yi | H04L 5/001 |
| | | | 370/329 |
| 2023/0217458 A1* | 7/2023 | Bang | H04W 48/12 |
| | | | 370/329 |
| 2023/0262699 A1* | 8/2023 | Kusashima | H04L 5/0053 |
| 2023/0276441 A1* | 8/2023 | Wang | H04W 72/1273 |
| | | | 370/329 |
| 2023/0328752 A1* | 10/2023 | Nimbalker | H04W 72/232 |
| | | | 370/329 |
| 2023/0345504 A1* | 10/2023 | Lee | H04L 5/0053 |
| 2024/0064762 A1* | 2/2024 | Sun | H04L 1/0038 |

* cited by examiner

*30*

*300*

Start

*302*

Receive a DCI from a network

*304*

Determine a plurality of first cells for at least one communication operation from a cell set according to the DCI

*306*

Perform the at least one communication operation with the network via at least one cell of the plurality of first cells

*308*

End

80

C3

| K0 | SLIV |
|---|---|
| $K0_{C3,0}$ | $SLIV_{C3,0}$ |
| $K0_{C3,1}$ | $SLIV_{C3,1}$ |
| $K0_{C3,2}$ | $SLIV_{C3,2}$ |
| $K0_{C3,3}$ | $SLIV_{C3,3}$ |

TDRA_Config3

C4

| K0 | SLIV |
|---|---|
| $K0_{C4,0}$ | $SLIV_{C4,0}$ |
| $K0_{C4,1}$ | $SLIV_{C4,1}$ |
| $K0_{C4,2}$ | $SLIV_{C4,2}$ |
| $K0_{C4,3}$ | $SLIV_{C4,3}$ |

TDRA_Config4

C0

| K0 | SLIV |
|---|---|
| $K0_{C0,0}$ | $SLIV_{C0,0}$ |
| $K0_{C0,1}$ | $SLIV_{C0,1}$ |
| $K0_{C0,2}$ | $SLIV_{C0,2}$ |
| $K0_{C0,3}$ | $SLIV_{C0,3}$ |

TDRA_Config0

C2

| K0 | SLIV |
|---|---|
| $K0_{C2,0}$ | $SLIV_{C2,0}$ |
| $K0_{C2,1}$ | $SLIV_{C2,1}$ |
| $K0_{C2,2}$ | $SLIV_{C2,2}$ |
| $K0_{C2,3}$ | $SLIV_{C2,3}$ |

TDRA_Config2

C1

| K0 | SLIV |
|---|---|
| $K0_{C1,0}$ | $SLIV_{C1,0}$ |
| $K0_{C1,1}$ | $SLIV_{C1,1}$ |
| $K0_{C1,2}$ | $SLIV_{C1,2}$ |
| $K0_{C1,3}$ | $SLIV_{C1,3}$ |

TDRA_Config1

FIG. 8

DEVICE AND METHOD FOR HANDLING A MULTI-CELL SCHEDULING

CROSS REFERENCE TO RELATED APPLICATIONS

This application claims the benefit of U.S. Provisional Application No. 63/333,564, filed on Apr. 22, 2022. The content of the application is incorporated herein by reference.

BACKGROUND OF THE INVENTION

1. Field of the Invention

The present invention relates to a device and a method used in a wireless communication system, and more particularly, to a device and a method of handling a multi-cell scheduling.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

An LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

A downlink (DL) control information (DCI) can be used for scheduling a physical DL shared channel (PDSCH) or a physical uplink (UL) shared channel (PUSCH) in a cell, notifying user equipments (UEs) of a slot format, notifying UEs of an unavailable physical resource block(s) (PRB(s)) and an unavailable orthogonal frequency division multiplexing (OFDM) symbol(s), transmitting transmit power control (TPC) commands for a physical UL control channel (PUCCH), the PUSCH and/or a sounding reference signal (SRS) transmission(s). In the current communication system, one DCI schedules only one cell (e.g., the PDSCH in the cell or the PUSCH in the cell), which cause a poor performance of the communication system (e.g., a poor scheduling efficiency and a higher overhead for DL control resources). Thus, how to improve a cell scheduling to improve the performance of the communication system is an important problem to be solved.

SUMMARY OF THE INVENTION

The present invention therefore provides a communication device and method for handling a multi-cell scheduling to solve the abovementioned problem.

A communication device for handling a multi-cell scheduling comprises at least one storage device; and at least one processing circuit, coupled to the at least one storage device, wherein the at least one storage device stores instructions, and the at least one processing circuit is configured to execute the instructions of: receiving a downlink (DL) control information (DCI) from a network; determining a plurality of first cells for at least one communication operation from a cell set according to the DCI; and performing the at least one communication operation with the network via at least one cell of the plurality of first cells.

A network for handling a multi-cell scheduling comprises at least one storage device; and at least one processing circuit, coupled to the at least one storage device, wherein the at least one storage device stores instructions, and the at least one processing circuit is configured to execute the instructions of: transmitting a downlink (DL) control information (DCI) to a communication device; and performing at least one communication operation with the communication device via at least one cell of a plurality of first cells; wherein the plurality of first cells is determined for the at least one communication operation from a cell set according to the DCI.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a schematic diagram of a scenario for determining a plurality of TDRAs for a plurality of scheduled cells according to an example of the present invention.

DETAILED DESCRIPTION

Figure 1:
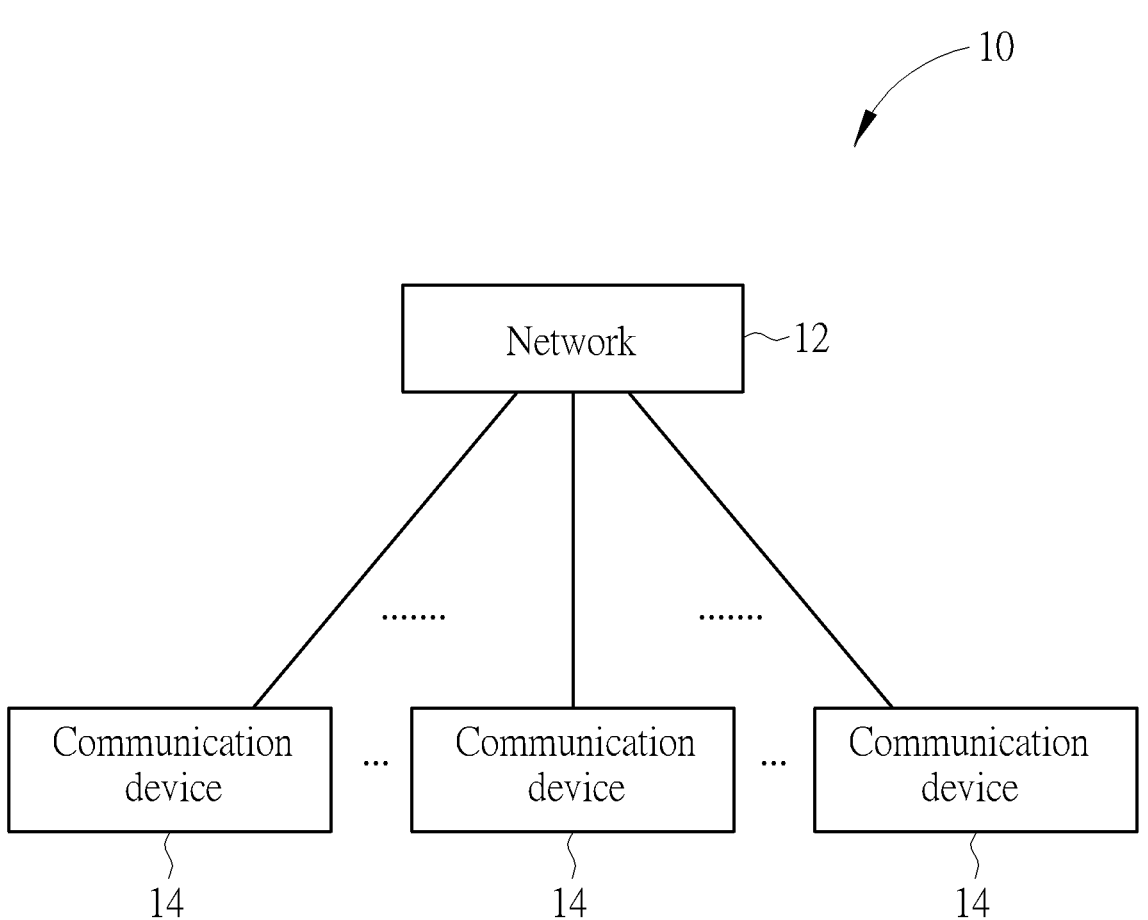
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and a communication device 14 may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network 12 and a communication device 14 may communicate with each other via multiple serving cells (e.g., multiple serving carriers) including a primary cell (e.g., primary component carrier) and one or more secondary cells (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 may be an evolved UTRAN (E-UTRAN) including at least one evolved NB (eNB) and/or at least one relay node in a long term evolution (LTE) system, an LTE-Advanced (LTE-A) system, an evolution of the LTE-A system, etc. In one example, the network 12 may be a next generation radio access network (NG-RAN) including at least one next generation Node-B (gNB) and/or at least one fifth generation (5G) base station (BS). In one example, the gNB or the 5G BS of network 12 may include a NTN Gateway and a NTN payload. In one example, the network 12 may be any BS conforming to a specific communication standard to communicate with a communication device 14.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), Access and Mobility Management Function (AMF), Session Management Function (SMF), User Plane Function (UPF), Authentication Server Function (AUSF), etc. In one example, after the network 12 receives information transmitted by a communication device 14, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

In addition, the network 12 may also include a service provider and at least one base transceiver station (BTS). The service provider may be an organization that provides services (e.g., consulting, legal, real estate, communications, storage, and processing services). The at least one BTS may be at least one NB, at least one eNB, at least one gNB and/or at least one 5G BS. The service provider may transmit service data to the BTS, and the BTS may forward the service data to a communication device 14. In one example, the service data may be service information such as Internet security, ringtone music, e-reading, daily life applications, bill collection, etc. In one example, the service data may be video and/or audio data (e.g., with a format h.265, h.266, or AV1 or conforming to Moving Picture Experts Group 4 (MPEG-4)). In one example, the service data may be data for an augmented reality (AR), a virtual reality (VR), a mixed reality (MR) and/or an extended reality (XR). The AR, VR and XR may be introduced to various areas such as entertainment, education, social interactions and communications. The service provider may generate corresponding data according to data associated to a communication device 14 (e.g., a geographic location of the communication device 14, Bluetooth information for the communication device 14, information of the communication device 14 stored by the service provider).

A communication device 14 may be a user equipment (UE), a Very Small Aperture Terminal (VSAT), a low cost device (e.g., machine type communication (MTC) device), a device-to-device (D2D) communication device, a narrowband internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
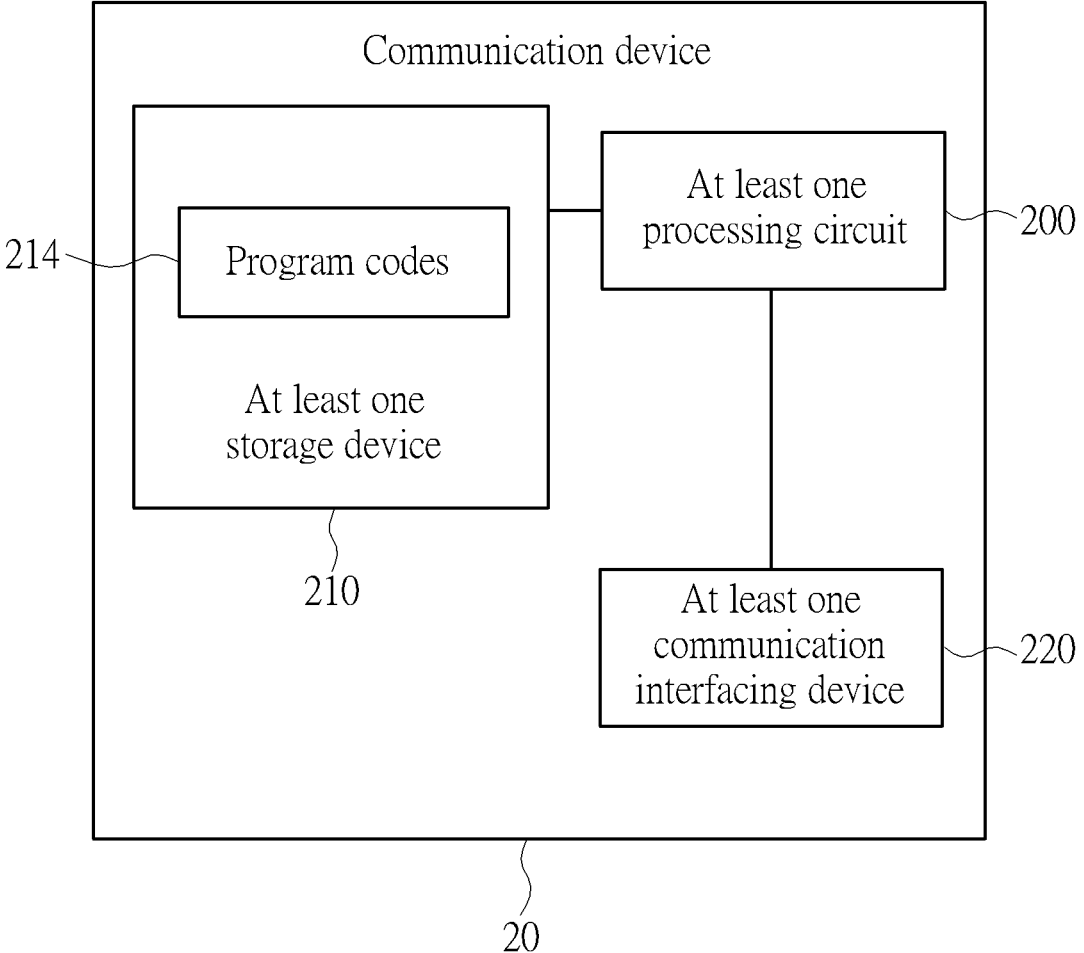
FIG. 2 is a schematic diagram of a communication device according to an example of the present invention.

FIG. 2 is a schematic diagram of a communication device 20 according to an example of the present invention. The communication device 20 may be a communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
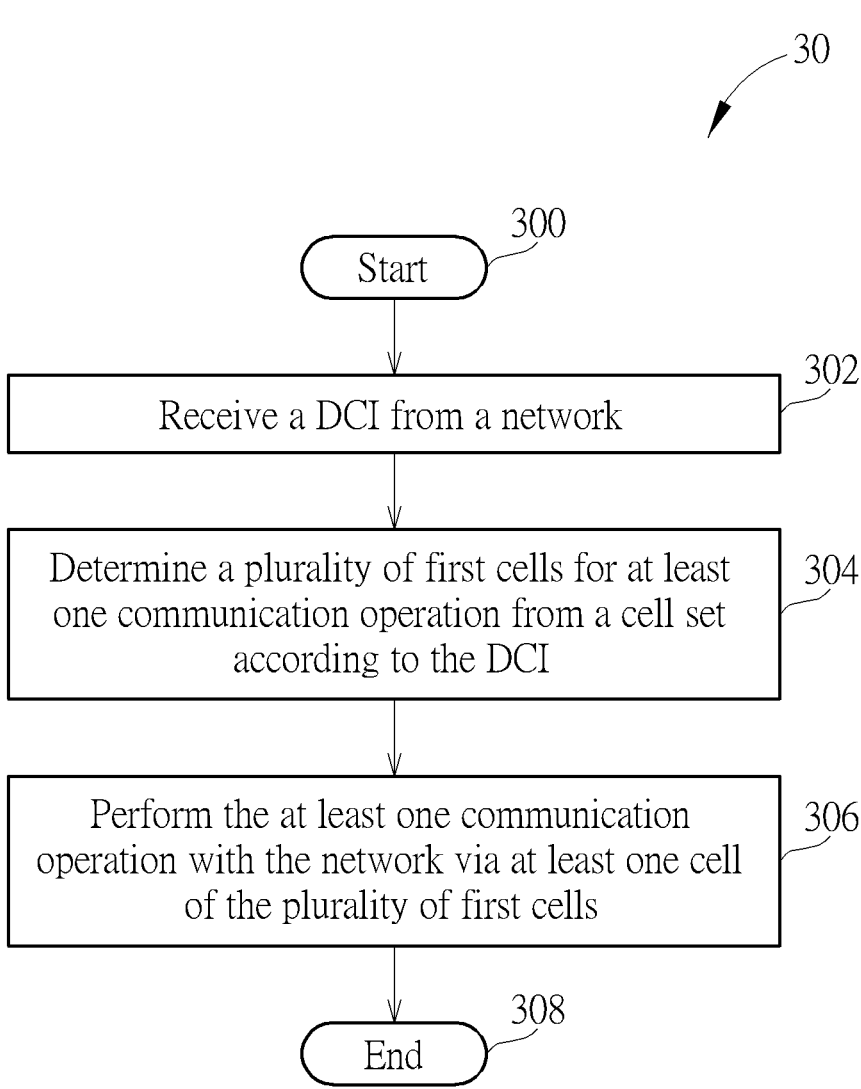
FIG. 3 is a flowchart of a process according to an example of the present invention.

FIG. 3 is a flowchart of a process 30 according to an example of the present invention. The process 30 may be utilized in a communication device (e.g., a communication device 14 in FIG. 1 or the communication device 20 in FIG. 2), to handle a multi-cell scheduling. The process 30 may be compiled into the program codes 214 and includes the following steps:

Step 300: Start.

Step 302: Receive a DL control information (DCI) from a network.

Step 304: Determine a plurality of first cells for at least one communication operation from a cell set according to the DCI.

Step 306: Perform the at least one communication operation with the network via at least one cell of the plurality of first cells.

Step 308: End.

According to the process 30, the communication device receives (e.g., monitors) a DCI from a network, and determines (e.g., schedules) a plurality of first cells (e.g., a plurality of scheduled cells) for at least one communication operation from a cell set according to the DCI. The cell set comprises a plurality of candidate cells for scheduling the at least one communication operation. Then, the communication device performs the at least one communication operation with the network via at least one cell of the plurality of first cells. That is, the DCI is used for scheduling the plurality of first cells to improve a performance of the communication device (e.g., to reduce an overhead of a physical DL control channel(s) (PDCCH(s)) for a DCI transmission(s)).

Realization of the process 30 is not limited to the above description. The following examples may be applied to realize the process 30.

In one example, the step 306 comprises that the communication device transmits at least one physical UL shared channel (PUSCH) to the network via the at least one cell of the plurality of first cells according to the DCI (e.g., DCI format 0_1, but is not limited herein) For example, the communication device transmits a PUSCH via a cell of the plurality of first cells. For example, the communication device transmits at least two PUSCHs via at least two cells of the plurality of first cells, respectively. In one example, the step 306 comprises that the communication device receives at least one physical DL shared channel (PDSCH) from the network via the at least one cell of the plurality of first cells according to the DCI (e.g., DCI format 1_1, but is not limited herein). For example, the communication device receives a PDSCH via a cell of the plurality of first cells. For example, the communication device receives at least two PDSCHs via at least two cells of the plurality of first cells, respectively.

In one example, the communication device transmits a capability of the communication device regarding to a maximum number of the plurality of first cells for a multi-cell scheduling (e.g., PDSCH and/or PUSCH) to the network. In one example, the capability comprises at least one of a maximum number of the plurality of first cells scheduled by the DCI to receive at least one PDSCH or a maximum number of the plurality of first cells scheduled by the DCI to transmit at least one PUSCH. In one example, the communication device transmits the capability corresponding to a frequency range (FR) (e.g., FR1 or FR2).

In one example, a number of the plurality of first cells is determined according to a format of the DCI (e.g., DCI format(s) 1_1 and/or 0_1, but is not limited herein). In one example, the number of the plurality of first cells is determined according to a higher layer configuration, and the higher layer configuration is a search space (SS) configuration or a PDCCH configuration. In one example, the number of the plurality of first cells is a fixed value. In one example, the number of the plurality of first cells is determined according to the capability of the communication device. In one example, the number of the plurality of first cells is the same as a number of the plurality of candidate cells in the cell set. That is, all the plurality of candidate cells in the cell set are scheduled to the communication device for the at least one communication operation.

In one example, a maximum number of the plurality of first cells is determined according to the format of the DCI (e.g., the DCI format(s) 1_1 and/or 0_1, but is not limited herein). In one example, the maximum number of the plurality of first cells is determined according to a higher layer configuration, and the higher layer configuration is a search space (SS) configuration or a PDCCH configuration. In one example, the maximum number of the plurality of first cells is a fixed value. In one example, the maximum number of the plurality of first cells is determined according to the capability of the communication device.

In one example, the step 306 comprises that the communication device does not transmits a PUSCH to the network via one of the plurality of first cells according to at least one DCI field corresponding to the one of the plurality of first cells in the DCI; or the communication device does not receives a PDSCH from the network via the one of the plurality of first cells according to the at least one DCI field corresponding to the one of the plurality of first cells in the DCI. That is, the one of the plurality of first cells is not scheduled with any PUSCH or any PDSCH, or is not scheduled with any transport block (TB) for the PUSCH or the PDSCH.

In one example, the step 306 comprises that the communication device releases a (e.g., configure grant (CG) PUSCH) transmission via one of the plurality of first cells according to at least one DCI field corresponding to the one of the plurality of first cells in the DCI; or the communication device releases a (e.g., semi persistent scheduling (SPS) PDSCH) reception via the one of the plurality of first cells according to the at least one DCI field corresponding to the one of the plurality of first cells in the DCI. That is, in addition to the PUSCH or the PDSCH for the one of the plurality of first cells scheduled dynamically, a (CG PUSCH) transmission or a (SPS PDSCH) reception via the one of the plurality of first cells may be indicated to release (or stop) by the DCI.

In one example, the step 306 comprises that the communication device activates (or triggers) a (e.g., CG PUSCH) transmission via one of the plurality of first cells according to at least one DCI field corresponding to the one of the plurality of first cells in the DCI; or the communication device activates (or triggers) a (e.g., SPS PDSCH) reception via the one of the plurality of first cells according to the at least one DCI field corresponding to the one of the plurality of first cells in the DCI. That is, in addition to a PUSCH or a PDSCH for one of the plurality of first cells scheduled dynamically, a (CG PUSCH) transmission or a (SPS PDSCH) reception via one of the plurality of first cells may be activated (or triggered) by the DCI.

In one example, the at least one DCI field comprises at least one of a frequency domain resource assignment (FDRA) field, a time domain resource assignment (TDRA) field, a modulation coding scheme (MCS) field or a redundancy version (RV) field.

In one example, the cell set comprises a plurality of second cells determined according to the higher layer configuration. In one example, the higher layer configuration is a SS configuration or a PDCCH configuration. In one example, a number of the plurality of second cells is determined according to the format of the DCI (e.g., the DCI format(s) 1_1 and/or 0_1, but is not limited herein). In one example, a number of the plurality of second cells is determined according to the capability of the communication device. In one example, a number of the plurality of second cells is determined according to the higher layer configuration. In one example, the plurality of second cells are the same as the plurality of first cells.

In one example, the plurality of first cells are configured with a plurality of SS configurations associated with a same SS index, respectively. In one example, the plurality of SS configurations associated with the same SS index are configured individually. In one example, each of the plurality of SS configurations associated with the same SS index corresponds to at least one format of the DCI and an aggregation level (AL). In one example, the plurality of SS configurations associated with the same SS index correspond to a same format of the DCI (e.g., the DCI format 1_1 or 0_1, but is not limited herein). In one example, the communication device receives (e.g., monitors) the DCI according to a SS configuration associated with a SS index. The SS configuration may be one of the plurality of SS configurations associated with the same SS index, and the SS index may be the same SS index associated with the plurality of SS configurations.

In one example, the cell set is selected from a plurality of cell sets according to the DCI. A number of the plurality of cell sets may be 2, but is not limited herein. That is, a plurality of cells may be configured and respectively scheduled by the DCI (e.g., the DCI format 1_1 or 0_1, but is not limited herein) from a same scheduling cell. In one example, the plurality of first cells are configured with a same cell set index. In one example, each of the plurality of first cells is configured with at least one active bandwidth part (BWP). In one example, the plurality of first cells are configured with a same group (e.g., cell set) index. The same group index may be configured in a cell in the plurality of first cells, a BWP of a cell in the plurality of first cells and/or a SS configured in a cell in the plurality of first cells. The group index may be configured in a BWP configuration or a SS configuration, but is not limited herein. In one example, a cell in a (e.g., first) cell set may not be included in another (e.g., second) cell set. In one example, the plurality of first cells are respectively configured with a plurality of BWP corresponding to a same SCS (e.g., 15 kHZ, 30 kHZ or 60 kHZ).

In one example, the communication device determines the plurality of first cells according to a value of a field (e.g., a carrier indicator field (CIF)) in the DCI. In one example, the value is a cell index corresponding to one of the plurality of first cells. In one example, the communication device receives the DCI according to the one of the plurality of first cells with the cell index. In one example, the communication device determines the plurality of first cells according to a bitmap in the DCI. In one example, a bit length of the bitmap is a number of the plurality of candidate cells in the cell set, and a plurality of bits in the bitmap correspond to the plurality of candidate cells, respectively. In one example, a bit "1" in the bitmap represents that a corresponding cell of the plurality of candidate cells is determined as one of the plurality of first cells, while a bit "0" in the bitmap represents that a corresponding cell of the plurality of candidate cells is not determined as one of the plurality of first cells.

In one example, the communication device determines the plurality of first cells according to a first indicator and a second indicator in the DCI. The first indicator indicates the cell set. The second indicator indicates the plurality of first cells. The second indicator may be the bitmap, but is not limited herein. In one example, the communication device determines the plurality of first cells according to the DCI and a higher layer configuration (e.g., a radio resource control (RRC) configuration). In one example, the DCI comprises a value of a field (e.g., a cell index in a CIF) corresponding to one of the plurality of first cells, and the one of the plurality of first cells is used for receiving (e.g., monitoring) the DCI. In one example, the higher layer configuration comprises a relationship between the values of the field in the DCI and the plurality of first cells. For example, there are five cells C0-C4 configured with cell indexes 000, 001, 010, 011 and 110, respectively, and the higher layer configuration comprises a relationship between the cell indexes and the plurality of first cells shown in Table 1. In the case where the communication device receives (e.g., monitors) the DCI via the cell C0, the DCI comprises a field with value 000 and the communication device determines the cells C0-C2 as the plurality of first cells according to the higher layer configuration. In the case where the communication device receives (e.g., monitors) the DCI via the cell C2, the DCI comprises a field with value 010 and the communication device determines the cells C1 and C2 as the plurality of first cells according to the higher layer configuration. The Table 1 is an example for illustrating how to determine the plurality of first cells according to the higher layer configuration, but is not limited herein.

TABLE 1

| The field in the DCI | The plurality of first cells |
| --- | --- |
| 000 | C0, C1 and C2 |
| 001 | C1 and C3 |
| 010 | C1 and C2 |
| 011 | C1 and C3 |
| 100 | C3 and C4 |

In one example, the communication device transmits a hybrid automatic repeat request (HARQ) feedback corresponding to the DCI to the network according to a HARQ timing indicator in the DCI and a slot index associated with a slot for receiving a PDSCH. In one example, the communication device performs the at least one communication operation with the network via the at least one cell of the plurality of first cells according to a SCS configuration.

In one example, the DCI comprises a plurality of FDRA fields. In one example, the communication device determines a plurality of FDRA for the plurality of first cells according to the plurality of FDRA fields, respectively. In one example, the communication device determines a plurality of active BWPs for the plurality of first cells according to the plurality of FDRA, respectively. That is, the communication device determines whether to change the plurality of active BWPs for the plurality of first cells according to a plurality of frequency domain resources indicated by the plurality of FDRA. In one example, the plurality of FDRA fields corresponds to the plurality of first cells, respectively.

In one example, the plurality of FDRA fields have a same bit length. In one example, the same bit length of the plurality of FDRA fields is determined according to a reference cell or a reference BWP of the reference cell. For example, the reference cell is a cell with a maximum cell size (e.g., with a maximum number of resource block group (RBG) or physical resource block (PRB)) among the plurality of candidate cells in the cell set, and the same bit length of the plurality of FDRA fields is determined according to the maximum cell size of the reference cell. For example, the reference cell is a cell for the communication device to receive the DCI, and the same bit length of the plurality of FDRA fields is determined according to a size of the reference cell. For example, the reference BWP is a BWP with a maximum BWP size (e.g., with a maximum number of RBG or PRB) among a plurality of BWPs of the plurality of candidate cells in the cell set, and the same bit length of the plurality of FDRA fields is determined according to the maximum BWP size of the reference BWP. For example, the reference BWP is a (e.g., active) BWP of a cell for the communication device to receive the DCI, and the same bit length of the plurality of FDRA fields is determined according to a size of the reference BWP. In one example, the same bit length of the plurality of FDRA fields is configured by the network (e.g., via at least one of a higher layer signal, a RRC and/or a medium access control (MAC)).

In one example, a plurality of bit lengths of the plurality of FDRA fields are different. In one example, the plurality of bit lengths of the plurality of FDRA fields are determined according to the plurality of first cells (e.g., a plurality of BWP sizes of the plurality of first cells and/or a plurality of cell sizes of the plurality of first cells), respectively. In one example, the plurality of bit lengths of the plurality of FDRA fields are configured by the network (e.g., via at least one of a higher layer signal, a RRC and/or a MAC).

In one example, the plurality of FDRA indicates the plurality of frequency domain resources in a plurality of active BWPs, respectively. In one example, a plurality of basic units of the plurality of frequency domain resources is different RBGs or different PRBs (e.g., 2, 4, 8 or 16 PRBs). That is, each of the plurality of FDRA fields corresponds to a RBG granularity or a PRB granularity. In one example, a plurality of RGB granularities or a plurality of PRB granularities (e.g., corresponding to the FDRA fields) are configured for the plurality of first cells by the network, respectively. In one example, an ordering of the plurality of FDRA fields in the DCI is determined according to a plurality of cell indexes of the plurality of first cells.

In one example, the DCI comprises a TDRA field. In one example, the communication device determines a plurality of TDRAs for the plurality of first cells according to the TDRA field and a plurality of TDRA configurations. In one example, the communication device determines the plurality of TDRA for the plurality of first cells according to at least one numerology (e.g., at least one SCS). In one example, the TDRA field corresponds to the plurality of first cells. In one example, the plurality of TDRA configurations correspond to the plurality of first cells, respectively, and each of the plurality of TDRA configurations comprises at least one of a cell index, a start and length indicator value (SLIV), a slot offset or a mapping type.

In one example, the plurality of candidate cells in the cell set are configured with (e.g., support) a same maximum number of at least one codeword (e.g., maxNrofCode-WordsScheduledByDCI=1 or 2). In one example, the plurality of candidate cells are configured with (e.g., support) a same maximum number of at least one TB. That is, bit lengths of a MCS field and a new data indicator (NDI) field in the DCI may be fixed. In one example, the plurality of candidate cells are configured with (e.g., support) a same DMRS type (e.g., dmrs-type 1 or 2). In one example, the plurality of candidate cells are configured with (e.g., support) a same number of at least one DMRS symbol. That is, a bit length of an antenna port field in the DCI may be fixed.

In one example, the DCI comprises a plurality of DCI field sets, and the plurality of DCI field sets corresponds to the plurality of first cells, respectively. In one example, each of the plurality of DCI field sets comprises at least one of a FDRA field, an antenna port field, a modulation and coding scheme field, a sounding reference signal (SRS) resource indicator field, a precoding information and number of layers (TPMI) field, a HARQ process number field, a transmission power control (TPC) command field for at least one scheduled PUSCH (e.g., if the at least one communication operation indicated by the DCI comprises at least one PUSCH transmission), a New data indicator (NDI) field, a Redundancy version (RV) field or a phase-tracking reference signal-demodulation reference signal (PTRS-DMRS) association field (e.g., if the at least one communication operation indicated by the DCI comprises at least one PUSCH transmission). In one example, each field of the plurality of DCI field sets is configured independently (or individually). In one example, a bit length of the each field is determined according to a reference BWP of a reference cell (e.g., at least one configuration, at least one information and/or at least one parameter of the reference BWP). In one example, the bit length of the each field is determined according to the reference cell (e.g., at least one configuration, at least one information and/or at least one parameter of the reference cell). In one example, an ordering of the plurality of DCI field sets in the DCI is determined according to the plurality of cell indexes of the plurality of first cells.

In one example, the DCI comprises at least one single DCI field, and the at least one single DCI field corresponds to the at least one cell of the plurality of first cells. In one example, the at least one single DCI field comprises at least one of an identifier field for a DCI format of the DCI, a TDRA field, a virtual resource block (VRB)-to-PRB mapping field, a SRS request field, a SRS offset indicator field, a channel state information (CSI) request field, a beta offset indicator field (e.g., if the at least one communication operation indicated by the DCI comprises at least one PUSCH transmission), an UL shared channel (UL-SCH) indicator field (e.g., if the at least one communication operation indicated by the DCI comprises at least one PUSCH transmission), a priority indicator field, a DMRS sequence initialization field, a rate matching indicator field (e.g., if the at least one communication operation indicated by the DCI comprises at least one PDSCH reception), a zero power (ZP) CSI reference signal (CSI-RS) trigger field (e.g., if the at least one communication operation indicated by the DCI comprises at least one PDSCH reception), a transmission configuration indication field (e.g., if the at least one communication operation indicated by the DCI comprises at least one PDSCH reception), an open-loop power control parameter set indicator field (e.g., if the at least one communication operation indicated by the DCI comprises at least one PUSCH transmission), a UL/supplementary uplink (UL/SUL) indicator field (e.g., if the at least one communication operation indicated by the DCI comprises at least one PUSCH transmission), a TPC commend field for at least one PUCCH (e.g., if the at least one communication operation indicated by the DCI comprises at least one PDSCH reception), a downlink assignment index field (e.g., if the at least one communication operation indicated by the DCI comprises at least one PDSCH reception), a PUCCH resource indicator field (e.g., if the at least one communication operation indicated by the DCI comprises at least one PDSCH reception), a HARQ timing indicator field (e.g., if the at least one communication operation indicated by the DCI comprises at least one PDSCH reception), an one-shot HARQ-acknowledgement (HARQ-ACK) request field (e.g., if the at least one communication operation indicated by the DCI comprises at least one PDSCH reception), a secondary cell (Scell) dormancy indication field, a minimum applicable scheduling offset indicator field, a PDCCH monitoring adaptation indication field, a PDSCH group index field (e.g., if the at least one communication operation indicated by the DCI comprises at least one PDSCH reception), a New feedback indicator field (e.g., if the at least one communication operation indicated by the DCI comprises at least one PDSCH reception), a PUCCH Cell indicator field (e.g., if the at least one communication operation indicated by the DCI comprises at least one PDSCH reception), an enhanced type3 codebook indicator field (e.g., if the at least one communication operation indicated by the DCI comprises at least one PDSCH reception), a HARQ-ACK retransmission indicator field (e.g., if the at least one communication operation indicated by the DCI comprises at least one PDSCH reception), an antenna port field, a SRS resource indicator field or a TPMI field. In one example, the UL/SUL indicator field may be a bitmap with length of N. For example, N may be the number of cells in a cell set. For example, N may be the number of the plurality of first cells.

In one example, at least one information carried in the at least one single DCI field is determined according to a reference BWP of a reference cell (e.g., at least one configuration, at least one information and/or at least one parameter of the reference BWP). In one example, the at least one information carried in the at least one single DCI field is determined according to the reference cell (e.g., at least one configuration, at least one information and/or at least one parameter of the reference cell). For example, the reference cell is a cell with a maximum cell size (e.g., with a maximum number of RBG or PRB) among the plurality of candidate cells in the cell set. For example, the reference cell is a cell for the communication device to receive the DCI. For example, the reference BWP is a BWP with a maximum BWP size (e.g., with a maximum number of RBG or PRB) among a plurality of BWPs of the plurality of candidate cells in the cell set. For example, the reference BWP is a (e.g., active) BWP of a cell for the communication device to receive the DCI. In one example, the at least one information carried in the at least one single DCI field is determined according to at least one SCS configuration.

Figure 4:
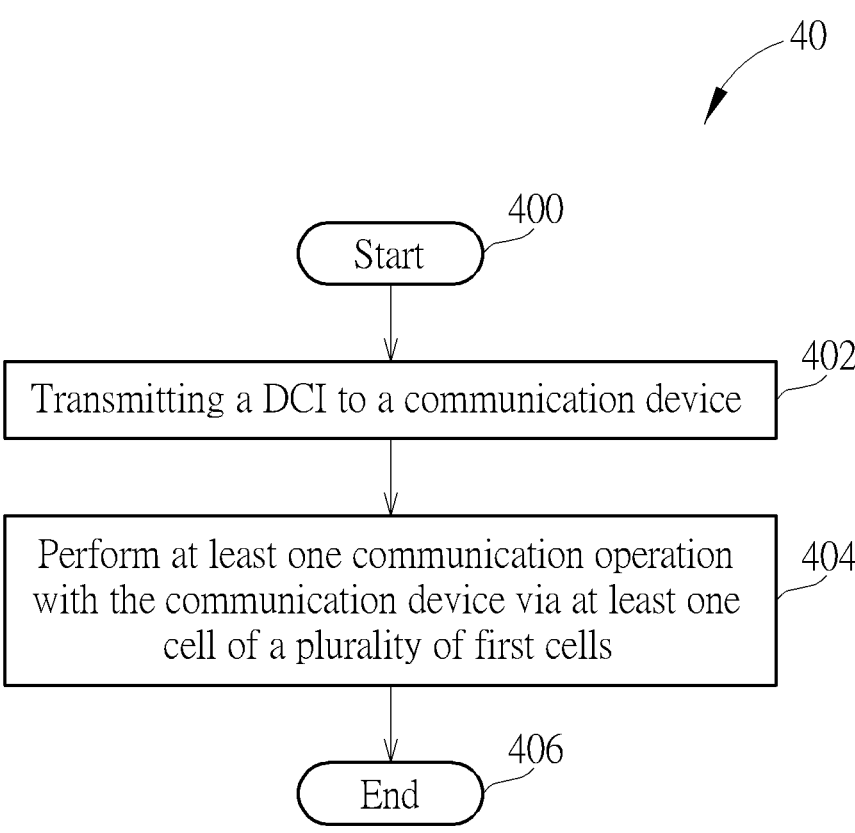
FIG. 4 is a flowchart of a process according to an example of the present invention.

FIG. 4 is a flowchart of a process 40 according to an example of the present invention. The process 40 may be utilized in a network (e.g., the network 12 in FIG. 1 or the communication device 20 in FIG. 2), to handle a multi-cell scheduling. The process 40 may be compiled into the program codes 214 and includes the following steps:

Step 400: Start.

Step 402: Transmitting a DCI to a communication device.

Step 404: Perform at least one communication operation with the communication device via at least one cell of a plurality of first cells.

Step 406: End.

According to the process 40, the network transmits a DCI to a communication device, and performs at least one communication operation with the communication device via at least one cell of a plurality of first cells (e.g., a plurality of scheduled cells). The plurality of first cells is determined (e.g., by the communication device) for the at least one communication operation from a cell set according to the DCI. That is, the DCI is used for scheduling the plurality of first cells to improve a performance of the network (e.g., to reduce an overhead of a PDCCH(s) for a DCI transmission(s)).

Realization of the process 40 is not limited to the above description. The following examples may be applied to realize the process 40.

In one example, the step 404 comprises that the network receives at least one PUSCH from the communication device via the at least one cell of the plurality of first cells. In one example, the step 404 comprises that the network transmits at least one PDSCH to the communication device via the at least one cell of the plurality of first cells. In one example, the network receives a capability of the communication device regarding to a maximum number of the plurality of first cells for a multi-cell scheduling from the communication device. The capability comprises at least one of a maximum number of the plurality of first cells scheduled by the DCI to receive at least one PDSCH or a maximum number of the plurality of first cells scheduled by the DCI to transmit at least one PUSCH.

In one example, the step 404 comprises that the network does not receive a PUSCH from the communication device via one of the plurality of first cells according to at least one DCI field corresponding to the one of the plurality of first cells in the DCI; or the network does not transmit a PDSCH to the communication device via the one of the plurality of first cells according to the at least one DCI field corresponding to the one of the plurality of first cells in the DCI. In one example, the at least one DCI field comprises at least one of a FDRA field, a TDRA field, a MCS field or a RV field.

In one example, the cell set comprises a plurality of second cells determined according to a higher layer configuration. In one example, the higher layer configuration is a SS configuration or a PDCCH configuration. In one example, the plurality of second cells are the same as the plurality of first cells. In one example, the plurality of first cells are configured with a plurality of SS configurations associated with a same SS index, respectively. In one example, the network transits the DCI according to a SS configuration associated with a SS index. In one example, the plurality of first cells are configured with a same cell set index. In one example, the network performs the at least one communication operation with the communication device via the at least one cell of the plurality of first cells according to a SCS configuration.

In one example, the DCI comprises a plurality of FDRA fields, and the plurality of FDRA fields corresponds to the plurality of first cells, respectively. In one example, the plurality of FDRA fields have a same bit length. The same bit length of the plurality of FDRA fields is determined according to a reference cell or a reference BWP of the reference cell. In one example, a plurality of bit lengths of the plurality of FDRA fields are different. The plurality of bit lengths of the plurality of FDRA fields are determined according to the plurality of first cells, respectively. In one example, a plurality of FDRA for the plurality of first cells are determined according to the plurality of FDRA fields, respectively. In one example, a plurality of active BWPs for the plurality of first cells is determined according to the plurality of FDRA, respectively. In one example, the plurality of FDRA indicates the plurality of frequency domain resources in the plurality of active BWPs, respectively. In one example, each of the plurality of FDRA fields corresponds to a RBG granularity or a PRB granularity. In one example, a plurality of RGB granularities or a plurality of PRB granularities (e.g., corresponding to the FDRA fields) are configured for the plurality of first cells by the network, respectively. In one example, the DCI comprises a TDRA field, and the TDRA field corresponds to the plurality of first cells.

In one example, the DCI comprises a plurality of DCI field sets, and the plurality of DCI field sets corresponds to the plurality of first cells, respectively. In one example, each of the plurality of DCI field sets comprises at least one of a FDRA field, an antenna port field, a modulation and coding scheme field, a SRS resource indicator field, a TPMI field, a HARQ process number field, a TPC command field for at least one scheduled PUSCH, a NDI field, a RV field or a PTRS-DMRS association field. In one example, the SRS resource indicator field may correspond to a codebook or a non-codebook indicated by a higher layer signal (e.g., txConfig).

In one example, the DCI comprises at least one single DCI field, and the at least one single DCI field corresponds to the at least one cell of the plurality of first cells. In one example, the at least one single DCI field comprises at least one of an identifier field for a DCI format of the DCI, a TDRA field, a VRB-to-PRB mapping field, a SRS request field, a SRS offset indicator field, a CSI request field, a beta offset indicator field, an UL-SCH indicator field, a priority indicator field, a DMRS sequence initialization field, a rate matching indicator field, a ZP CSI-RS trigger field, a transmission configuration indication field, an open-loop power control parameter set indicator field, a UL/SUL indicator field, a TPC commend field, a downlink assignment index field, a PUCCH resource indicator field, a HARQ timing indicator field, an one-shot HARQ-ACK request field, a Scell dormancy indication field, a minimum applicable scheduling offset indicator field, a PDCCH monitoring adaptation indication field, a PDSCH group index field, a New feedback indicator field, a PUCCH Cell indicator field, an enhanced type3 codebook indicator field, a HARQ-ACK retransmission indicator field, an antenna port field, a SRS resource indicator field or a TPMI field. In one example, the UL/SUL indicator field may be a bitmap with length of N. For example, N may be the number of cells in a cell set. For example, N may be the number of the plurality of first cells.

The examples of the process 30 may be applied to the process 40, and are not narrated herein for brevity.

Figure 5:
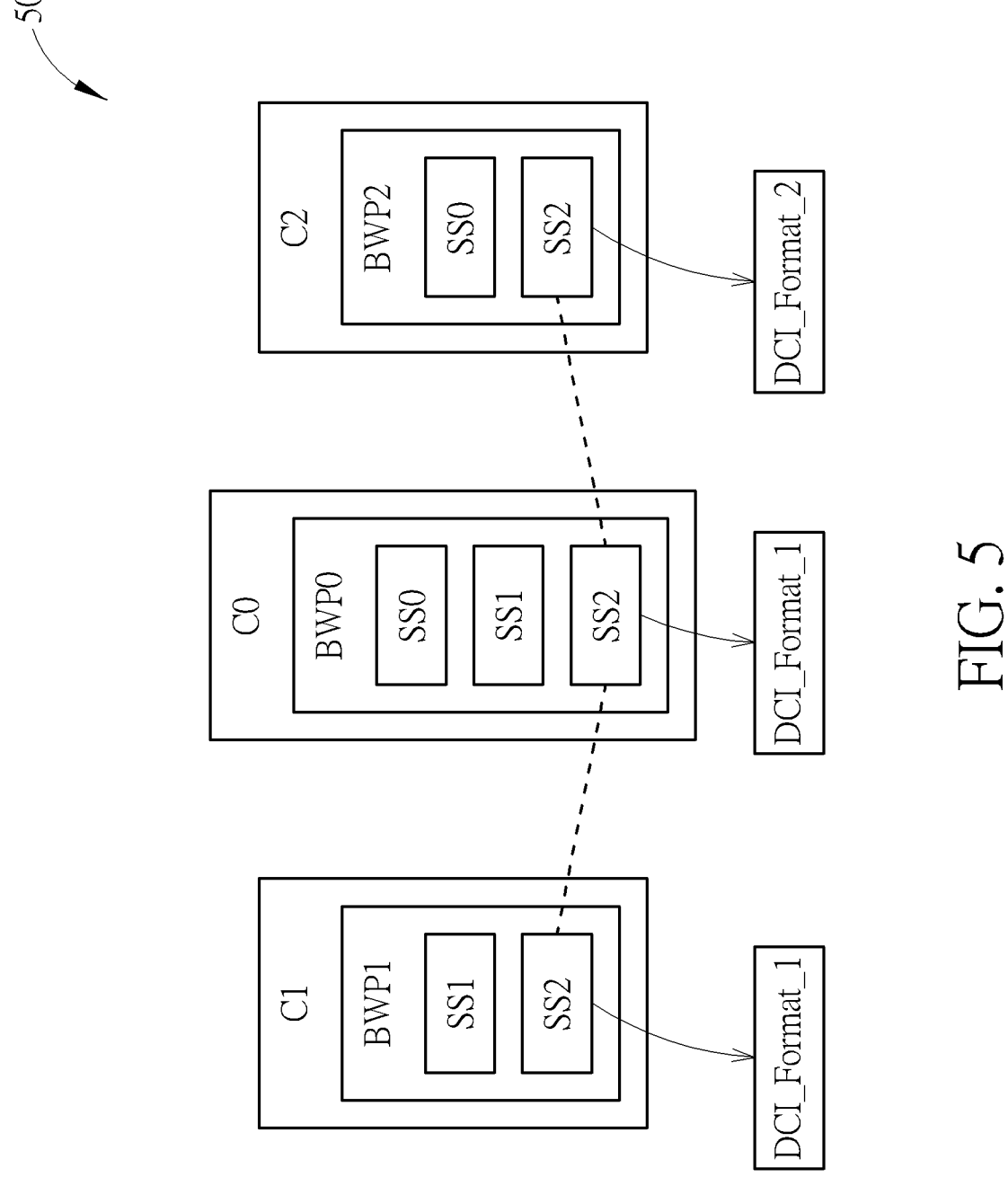
FIG. 5 is a schematic diagram of a scenario for determining a cell set according to an example of the present invention.

FIG. 5 is a schematic diagram of a scenario 50 for determining a cell set (e.g., the cell set in the process 30) according to an example of the present invention. In FIG. 5, cells C0-C2 may be used for a communication device (e.g., the communication device in the process 30) (not shown) to receive (e.g., monitor) a PDCCH(s). The cell C0 performed in an active BWP BWP0 is configured with three SS configurations with SS indexes SS0, SS1 and SS2. The cell C1 performed in an active BWP BWP1 is configured with two SS configurations with SS indexes SS1 and SS2. The cell C2 performed in an active BWP BWP2 is configured with two SS configurations with SS indexes SS0 and SS2. The SS configuration with SS index SS2 for the cell C0 corresponds to a DCI format DCI_Format_1 (e.g., a DCI format 1_1, but is not limited herein). The DCI format DCI_Format_1 is for a multi-cell scheduling. The SS configuration with SS index SS2 for the cell C1 corresponds to the DCI format DCI_Format_1. The SS configuration with SS index SS2 for the cell C2 corresponds to a DCI format DCI_Format_2 (e.g., a DCI format 1_2, but is not limited herein). The DCI format DCI_Format_2 is for a single cell scheduling. In one example, the communication device determines that the cell set comprises the cells C0-C2, because the cells C0-C2 are configured with the SS configurations with the same SS index SS2. That is, the cells C0-C2 can be simultaneously scheduled by the DCI format DCI_Format_1. In one example, the communication device determines that the cell set comprises the cells C0-C1, because the cells C0-C1 are configured with the SS configurations with the same SS index SS2 and their SS configurations corresponding to the same DCI format DCI_Format_1. That is, the cell C2 cannot simultaneously scheduled with the cell C0-C1 by the DCI format for multi-cell scheduling.

Figure 6:
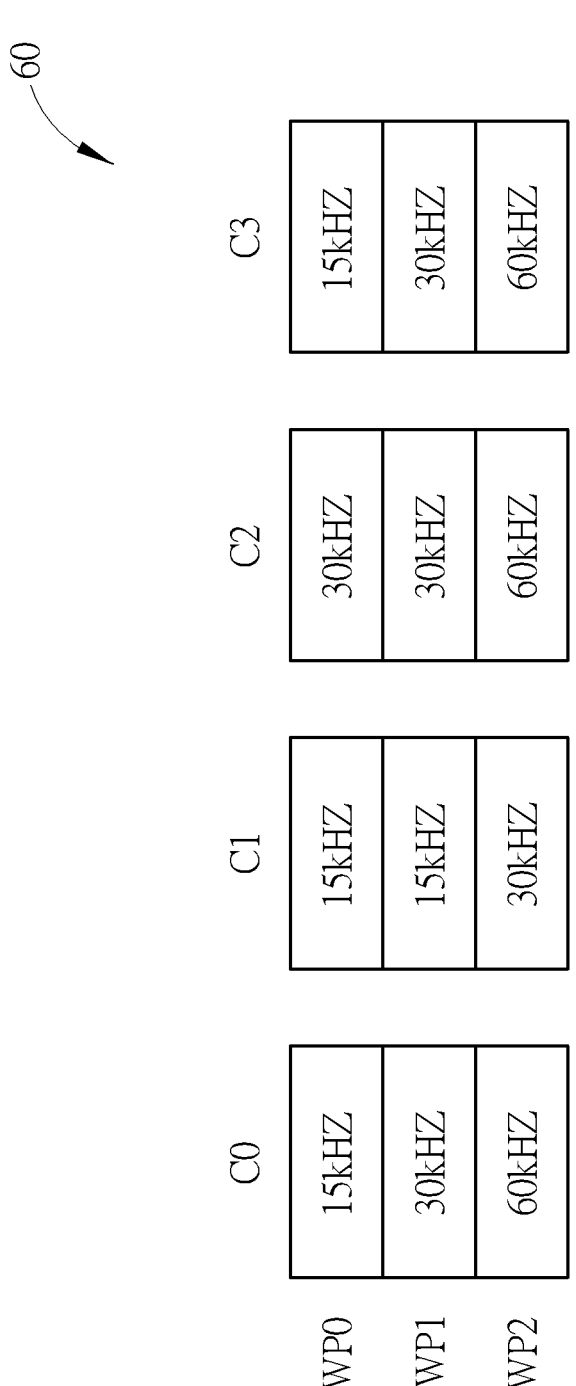
FIG. 6 is a schematic diagram of a scenario for determining a plurality of scheduled cells for at least one communication operation according to an example of the present invention.

FIG. 6 is a schematic diagram of a scenario 60 for determining a plurality of scheduled cells (e.g., the plurality of first cells in the process 30) for at least one communication operation (e.g., the at least one communication operation in the process 30) according to an example of the present invention. In FIG. 6, each of cells C0-C3 is configured with BWPs BWP0-BWP2. The BWPs BWP0-BWP2 of the cell C0 correspond to SCSs 15 kHZ, 30 kHZ and 60 kHZ, respectively. The BWPs BWP0-BWP2 of the cell C1 correspond to SCSs 15 kHZ, 15 kHZ and 30 kHZ, respectively. The BWPs BWP0-BWP2 of the cell C2 correspond to SCSs 30 kHZ, 30 kHZ and 60 kHZ, respectively. The BWPs BWP0-BWP2 of the cell C3 correspond to SCSs 15 kHZ, 30 kHZ and 60 kHZ, respectively. A communication device (e.g., the communication device in the process 30) (not shown) is configured with cells C0-C3, and receives a DCI (not shown) from a network (e.g., the network in the process 30) (not shown) via the cell C0.

In one example, the SCSs for the scheduled cells are the same, and the SCSs for the scheduled cells are the same as the SCS for the cell C0 to receive the DCI. That is, the cell C0 may be one of the scheduled cells. For example, in the case where an active BWP of the cell C0 is the BWP BWP0 corresponding to the SCS 15 kHZ, the cells C0, C1 and C3 may be comprised in a cell set (e.g., may be the scheduled cells), because the BWPs BWP0-BWP2 of the cell C2 do not correspond to the SCS 15 kHZ. For other example, in the case where an active BWP of the cell C0 is the BWP BWP0 corresponding to the SCS 15 kHZ, the cells C0, C1 and C3 may be comprised in a cell set if the active BWP of the cells C0, C1 and C3 are configured with the same SCS (e.g., 15 kHz). For example, in the case where an active BWP of the cell C0 is the BWP BWP1 corresponding to the SCS 30 kHZ, the cells C0-C3 may be comprised in a cell set (e.g., may be the scheduled cells). For other example, in the case where an active BWP of the cell C0 is the BWP BWP1 corresponding to the SCS 30 kHZ, the cells C0-C3 may be comprised in a cell set if the active BWP of the cells C0-C3 are configured with the same SCS (e.g., 30 kHz). For example, in the case where an active BWP of the cell C0 is the BWP BWP2 corresponding to the SCS 60 kHZ, the cells C0, C2 and C3 may be comprised in a cell set (e.g., may be the scheduled cells), because the BWPs BWP0-BWP2 of the cell C1 do not correspond to the SCS 60 kHZ. For other example, the cells C0, C2 and C3 may be comprised in a cell set if the active BWP of cells C0, C2 and C3 are configured with the same SCS (e.g., 60 kHz).

In one example, the SCSs for the cells in a cell set (e.g., the scheduled cells) are the same, and the SCSs for the cells in the cell set are not the same as (e.g., not smaller than) the SCS for the cell C0 to receive the DCI. That is, the cell C0 may not in the cell set (e.g., not be one of the scheduled cells). For example, in the case where an active BWP of the cell C0 is the BWP BWP1 corresponding to the SCS 15 kHZ, the cells C1-C3 may be comprised in a cell set, because the SCS 30 kHz for the cells C1-C3 is not smaller than the SCS 15 kHZ for the cell C0. For example, in the case where an active BWP of the cell C0 is the BWP BWP1 corresponding to the SCS 30 kHZ, the cells C2-C3 may be comprised in a cell set, because the SCS 60 kHz for the cells C2-C3 is not smaller than the SCS 30 kHZ for the cell C0 and the BWPs BWP0-BWP2 of the cell C1 do not correspond to the SCS 60 kHZ. For example, in the case where an active BWP of the cell C0 is the BWP BWP2 corresponding to the SCS 60 kHZ, the cells C2-C3 may be comprised in a cell set, because the SCS 60 kHz for the cells C2-C3 is not smaller than the SCS 60 kHz for the cell C0 and the BWPs BWP0-BWP2 of the cell C1 do not correspond to the SCS 60 kHZ.

Figure 7:
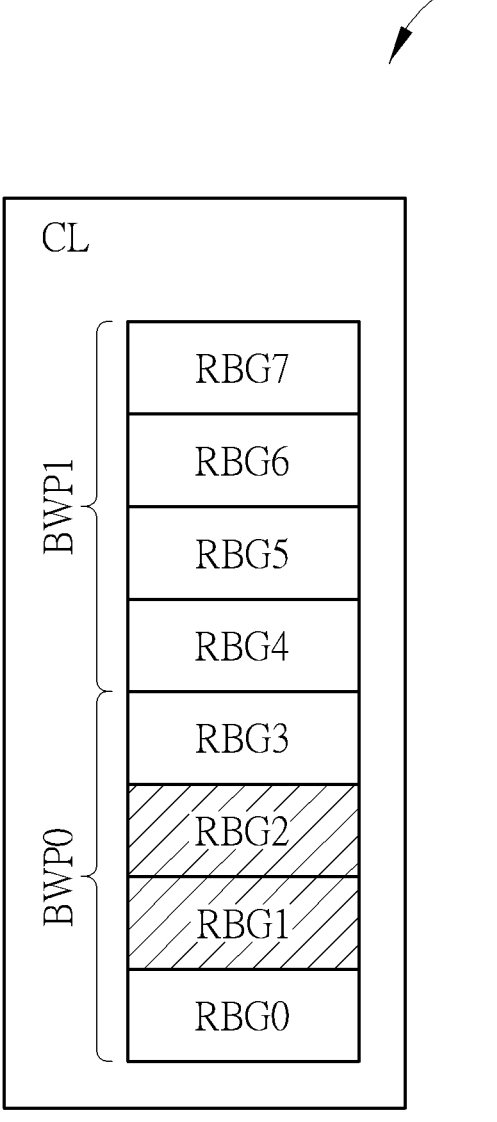
FIG. 7 is a schematic diagram of a scenario for determining whether to change an active BWP of a cell according to an example of the present invention.

FIG. 7 is a schematic diagram of a scenario 70 for determining whether to change an active BWP of a cell (e.g., one of the plurality of first cell in the process 30) according to an example of the present invention. In FIG. 7, a cell CL is configured BWPs BWP0 and BWP1. The BWP BWP0 comprises RBGs RBG0-RBG3, and the BWP BWP1 comprises RBGs RBG4-RBG7. A communication device (e.g., the communication device in the process 30) (not shown) receives a DCI (not shown) indicating the cell CL, and the DCI comprises a FDRA field indicating (e.g., corresponding to) the RBGs RBG1-RBG2 (indicated by slashes) of the cell CL. In one example, in the case where the current active BWP of the cell CL is the BWP BWP0, the communication device determines to change the active BWP from the BWP BWP0 to the BWP BWP1, because the RBGs RBG1-RBG2 indicated by the FDRA field are in the BWP BWP1 which is different from the current active BWP. In one example, in the case where the current active BWP of the cell CL is the BWP BWP1, the communication device determines not to change the active BWP, because the RBGs RBG1-RBG2 indicated by the FDRA field are in the BWP BWP1 which is the same as the current active BWP.

FIG. 8 is a schematic diagram of a scenario 80 for determining a plurality of TDRAs for a plurality of scheduled cells (e.g., the plurality of first cells in the process 30) according to an example of the present invention. In FIG. 8, TDRA configurations TDRA_Config0-TDRA_Config4 correspond to cells C0-C4, respectively. The TDRA configuration TDRA_Config0 comprises scheduling (e.g., slot) offsets $K0_{c0,0}$-$K0_{c0,3}$ and SLIVs $SLIV_{c0,0}$-$SLIV_{c0,3}$. The FIG. 8, but is not limited herein. The TDRA filed indicating "0" may correspond to the scheduling (e.g., slot) offset $K0_{c0,0}$ and the SLIV $SLIV_{c0,0}$ for the cell C0, the scheduling (e.g., slot) offset $K0_{c1,0}$ and the SLIV $SLIV_{c1,0}$ for the cell C1, the scheduling (e.g., slot) offset $K0_{c2,0}$ and the SLIV $SLIV_{c2,0}$ for the cell C2, the scheduling (e.g., slot) offset $K0_{c3,0}$ and the SLIV $SLIV_{c3,0}$ for the cell C3, and the scheduling (e.g., slot) offset $K0_{c4,0}$ and the SLIV $SLIV_{c4,0}$ for the cell C4. The TDRA filed indicating "1" may correspond to the scheduling (e.g., slot) offset $K0_{c0,1}$ and the SLIV $SLIV_{c0,1}$ for the cell C0, the scheduling (e.g., slot) offset $K0_{c1,1}$ and the SLIV $SLIV_{c1,1}$ for the cell C1, the scheduling (e.g., slot) offset $K0_{c2,1}$ and the SLIV $SLIV_{c2,1}$ for the cell C2, the scheduling (e.g., slot) offset $K0_{c3,1}$ and the SLIV $SLIV_{c3,1}$ for the cell C3, and the scheduling (e.g., slot) offset $K0_{c4,1}$ and the SLIV $SLIV_{c4,1}$ for the cell C4.

The TDRA filed indicating "2" may correspond to the scheduling (e.g., slot) offset $K0_{c0,2}$ and the SLIV $SLIV_{c0,2}$ for the cell C0, the scheduling (e.g., slot) offset $K0_{c1,2}$ and the SLIV $SLIV_{c1,2}$ for the cell C1, the scheduling (e.g., slot) offset $K0_{c2,2}$ and the SLIV $SLIV_{c2,2}$ for the cell C2, the scheduling (e.g., slot) offset $K0_{c3,2}$ and the SLIV $SLIV_{c3,2}$ for the cell C3, and the scheduling (e.g., slot) offset $K0_{c4,2}$ and the SLIV $SLIV_{c4,2}$ for the cell C4. The TDRA filed indicating "3" may correspond to the scheduling (e.g., slot) offset $K0_{c0,3}$ and the SLIV $SLIV_{c0,3}$ for the cell C0, the scheduling (e.g., slot) offset $K0_{c1,3}$ and the SLIV $SLIV_{c1,3}$ for the cell C1, the scheduling (e.g., slot) offset $K0_{c2,3}$ and the SLIV $SLIV_{c2,3}$ for the cell C2, the scheduling (e.g., slot) offset $K0_{c3,3}$ and the SLIV $SLIV_{c3,3}$ for the cell C3, and the scheduling (e.g., slot) offset $K0_{c4,3}$ and the SLIV $SLIV_{c4,3}$ for the cell C4. The TDRA filed may further correspond to a mapping type (not shown in Table 2), but is not limited herein.

TABLE 2

| TDRA filed | Scheduling offset and SLIV for C0 | Scheduling offset and SLIV for C1 | Scheduling offset and SLIV for C2 | Scheduling offset and SLIV for C3 | Scheduling offset and SLIV for C4 |
|---|---|---|---|---|---|
| 0 | $K0_{C0,\,0}$ and $SLIV_{C0,\,0}$ | $K0_{C1,\,0}$ and $SLIV_{C1,\,0}$ | $K0_{C2,\,0}$ and $SLIV_{C2,\,0}$ | $K0_{C3,\,0}$ and $SLIV_{C3,\,0}$ | $K0_{C4,\,0}$ and $SLIV_{C4,\,0}$ |
| 1 | $K0_{C0,\,1}$ and $SLIV_{C0,\,1}$ | $K0_{C1,\,1}$ and $SLIV_{C1,\,1}$ | $K0_{C2,\,1}$ and $SLIV_{C2,\,1}$ | $K0_{C3,\,1}$ and $SLIV_{C3,\,1}$ | $K0_{C4,\,1}$ and $SLIV_{C4,\,1}$ |
| 2 | $K0_{C0,\,2}$ and $SLIV_{C0,\,2}$ | $K0_{C1,\,2}$ and $SLIV_{C1,\,2}$ | $K0_{C2,\,2}$ and $SLIV_{C2,\,2}$ | $K0_{C3,\,2}$ and $SLIV_{C3,\,2}$ | $K0_{C4,\,2}$ and $SLIV_{C4,\,2}$ |
| 3 | $K0_{C0,\,3}$ and $SLIV_{C0,\,3}$ | $K0_{C1,\,3}$ and $SLIV_{C1,\,3}$ | $K0_{C2,\,3}$ and $SLIV_{C2,\,3}$ | $K0_{C3,\,3}$ and $SLIV_{C3,\,3}$ | $K0_{C4,\,3}$ and $SLIV_{C4,\,3}$ |

TDRA configuration TDRA_Config1 comprises scheduling (e.g., slot) offsets $K0_{c1,0}$-$K0_{c1,3}$ and SLIVs $SLIV_{c1,0}$-$SLIV_{c1,3}$. The TDRA configuration TDRA_Config2 comprises scheduling (e.g., slot) offsets $K0_{c2,0}$-$K0_{c2,3}$ and SLIVs $SLIV_{c2,0}$-$SLIV_{c2,3}$. The TDRA configuration TDRA_Config3 comprises scheduling (e.g., slot) offsets $K0_{c3,0}$-$K0_{c3,3}$ and SLIVs $SLIV_{c3,0}$-$SLIV_{c3,3}$. The TDRA configuration TDRA_Config4 comprises scheduling (e.g., slot) offsets $K0_{c4,0}$-$K0_{c4,3}$ and SLIVs $SLIV_{c4,0}$-$SLIV_{c4,3}$. The cells C0-C4 are candidate cells (e.g., the cell set in the process 30) for a communication device (not shown) to perform (e.g., schedule) at least one communication operation (e.g., the at least one communication operation in the process 30). The communication device receives a DCI comprising a TDRA filed (not shown) from a network (e.g., the network in the process 30) (not shown) via the cell C0.

The detail of the TDRA filed can be referred to Table 2. The Table 2 is an example for illustrating the TDRA filed in In one example, in the case where the communication device determines the cells C1 and C2 (indicated by slashes) as the scheduled cells from the cells C0-C4 and the TDRA filed indicates 3, the communication device determines the TDRA for the cell C1 according to the scheduling (e.g., slot) offsets $K0_{c1,3}$ and the SLIV $SLIV_{c1,3}$ (indicated by slashes) in the TDRA configurations TDRA_Config1, and determines the TDRA for the cell C2 according to the cell index $K0_{c2,3}$ and the SLIV $SLIV_{c2,3}$ (indicated by slashes) in the TDRA configurations TDRA_Config2. Thus, the communication device performs the at least one communication operation with the network according to the TDRA (s) for at least one of the cells C1-C2. The way to determine the schedule cells from the cells C0-C4 can be referred to the previous examples, and is not narrated herein for brevity.

The operation of "determine" described above may be replaced by the operation of "compute", "calculate", "obtain", "generate", "output, "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above may be replaced by "on", "in" or "at". The term of "when" described above may be replaced by "upon", "after" and "in response to". The term of "cell" described above may be replaced by "serving cell".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, embodiments of the present invention provide a communication device and method for handling a multi-cell scheduling. Multiple cells may be determined (e.g., scheduled) according to a SS index, a value of a field in a DCI, a bitmap in the DCI, indicators in the DCI, FDRA fields in the DCI, a TDRA field in the DCI and/or a higher layer configuration. Thus, the problem of improving a cell scheduling to improve a performance of the communication system can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a multi-cell scheduling, comprising:
at least one non-transitory computer-readable medium; and
at least one processing circuit, coupled to the at least one non-transitory computer-readable medium, wherein the at least one non-transitory computer-readable medium stores instructions, and the at least one processing circuit is configured to execute the instructions of:
transmitting a capability of the communication device to a network;
receiving a downlink (DL) control information (DCI) from the network;
determining a plurality of first cells for at least one communication operation from a cell set according to the DCI; and
performing the at least one communication operation with the network via at least one cell of the plurality of first cells according to a first sub-carrier spacing (SCS) configuration;
wherein the capability comprises at least one of a maximum number of the plurality of first cells scheduled by the DCI to receive at least one PDSCH or a maximum number of the plurality of first cells scheduled by the DCI to transmit at least one PUSCH;
wherein the cell set comprises a plurality of second cells determined according to a higher layer configuration;
wherein the cell set is selected from a plurality of cell sets according to the DCI;
wherein the first SCS configuration is different from a second SCS configuration for receiving the DCI.

2. The communication device of claim 1, wherein an instruction of performing the at least one communication operation with the network via the at least one cell of the plurality of first cells comprises:
transmitting at least one physical uplink (UL) shared channel (PUSCH) to the network via the at least one cell of the plurality of first cells.

3. The communication device of claim 1, wherein an instruction of performing the at least one communication operation with the network via the at least one cell of the plurality of first cells comprises:
receiving at least one physical DL shared channel (PDSCH) from the network via the at least one cell of the plurality of first cells.

4. The communication device of claim 1, wherein an instruction of performing the at least one communication operation with the network via the at least one cell of the plurality of first cells comprises:
not transmitting a PUSCH to the network via one of the plurality of first cells according to at least one DCI field corresponding to the one of the plurality of first cells in the DCI; or
not receiving a PDSCH from the network via the one of the plurality of first cells according to the at least one DCI field corresponding to the one of the plurality of first cells in the DCI.

5. The communication device of claim 4, wherein the at least one DCI field comprises at least one of a frequency domain resource assignment (FDRA) field, a time domain resource assignment (TDRA) field, a modulation coding scheme (MCS) field or a redundancy version (RV) field.

6. The communication device of claim 1, wherein the higher layer configuration is a search space (SS) configuration or a physical DL control channel (PDCCH) configuration.

7. The communication device of claim 1, wherein the plurality of second cells are the same as the plurality of first cells.

8. The communication device of claim 1, wherein the plurality of first cells are configured with a plurality of SS configurations associated with a same SS index, respectively.

9. The communication device of claim 1, wherein the communication device receives the DCI according to a SS configuration associated with a SS index.

10. The communication device of claim 1, wherein the plurality of first cells are configured with a same cell set index.

11. The communication device of claim 1, wherein the communication device determines the plurality of first cells according to a value of a field in the DCI.

12. The communication device of claim 11, wherein the value is a cell index corresponding to one of the plurality of first cells.

13. The communication device of claim 12, wherein the communication device receives the DCI according to the one of the plurality of first cells with the cell index.

14. The communication device of claim 1, wherein the communication device determines the plurality of first cells according to a bitmap in the DCI.

15. The communication device of claim 1, wherein the communication device determines the plurality of first cells according to the DCI and a higher layer configuration.

16. The communication device of claim 1, wherein the DCI comprises a plurality of FDRA fields, and the instructions further comprise:
   determining a plurality of FDRA for the plurality of first cells according to the plurality of FDRA fields, respectively.

17. The communication device of claim 16, wherein the plurality of FDRA fields corresponds to the plurality of first cells, respectively.

18. The communication device of claim 16, wherein the plurality of FDRA fields have a same bit length.

19. The communication device of claim 18, wherein the same bit length of the plurality of FDRA fields is determined according to a reference cell or a reference BWP of the reference cell.

20. The communication device of claim 16, wherein a plurality of bit lengths of the plurality of FDRA fields are different.

21. The communication device of claim 20, wherein the plurality of bit lengths of the plurality of FDRA fields are determined according to the plurality of first cells, respectively.

22. The communication device of claim 16, wherein the plurality of FDRA indicates the plurality of frequency domain resources in a plurality of active BWPs, respectively.

23. The communication device of claim 22, wherein each of the plurality of FDRA fields corresponds to a resource block group (RBG) granularity or a physical resource block (PRB) granularity.

24. The communication device of claim 1, wherein the DCI comprises a TDRA field, and the instructions further comprise:
   determining a plurality of TDRA for the plurality of first cells according to the TDRA field and a plurality of TDRA configurations.

25. The communication device of claim 24, wherein the TDRA field corresponds to the plurality of first cells.

26. The communication device of claim 24, wherein the plurality of TDRA configurations correspond to the plurality of first cells, respectively, and each of the plurality of TDRA configurations comprises at least one of a cell index, a start and length indicator value (SLIV), a slot offset or a mapping type.

27. The communication device of claim 1, wherein the DCI comprises a plurality of DCI field sets, and the plurality of DCI field sets corresponds to the plurality of first cells, respectively.

28. The communication device of claim 27, wherein each of the plurality of DCI field sets comprises at least one of a FDRA field, an antenna port field, a modulation and coding scheme field, a sounding reference signal (SRS) resource indicator field, a precoding information and number of layers (TPMI) field, a hybrid automatic repeat request (HARQ) process number field, a transmission power control (TPC) command field, a New data indicator (NDI) field, a Redundancy version (RV) field or a phase-tracking reference signal-demodulation reference signal (PTRS-DMRS) association field.

29. The communication device of claim 1, wherein the DCI comprises at least one single DCI field, and the at least one single DCI field corresponds to the at least one cell of the plurality of first cells.

30. The communication device of claim 29, wherein the at least one single DCI field comprises at least one of an identifier field for a DCI format of the DCI, a TDRA field, a virtual resource block (VRB)-to-PRB mapping field, a SRS request field, a SRS offset indicator field, a channel state information (CSI) request field, a beta offset indicator field, an UL shared channel (UL-SCH) indicator field, a priority indicator field, a DMRS sequence initialization field, a rate matching indicator field, a zero power (ZP) CSI reference signal (CSI-RS) trigger field, a transmission configuration indication field, an open-loop power control parameter set indicator field, a UL/supplementary uplink (UL/SUL) indicator field, a TPC commend field, a downlink assignment index field, a PUCCH resource indicator field, a HARQ timing indicator field, an one-shot HARQ-acknowledgement (HARQ-ACK) request field, a secondary cell (Scell) dormancy indication field, a minimum applicable scheduling offset indicator field, a PDCCH monitoring adaptation indication field, a PDSCH group index field, a New feedback indicator field, a PUCCH Cell indicator field, an enhanced type3 codebook indicator field, a HARQ-ACK retransmission indicator field, an antenna port field, a SRS resource indicator field or a TPMI field.

31. A network for handling a multi-cell scheduling, comprising:
   at least one non-transitory computer-readable medium; and
   at least one processing circuit, coupled to the at least one non-transitory computer-readable medium, wherein the at least one non-transitory computer-readable medium stores instructions, and the at least one processing circuit is configured to execute the instructions of:
   receiving a capability of a communication device form the communication device;
   transmitting a downlink (DL) control information (DCI) to the communication device; and
   performing at least one communication operation with the communication device via at least one cell of a plurality of first cells according to a first sub-carrier spacing (SCS) configuration;
   wherein the capability comprises at least one of a maximum number of the plurality of first cells scheduled by the DCI to receive at least one PDSCH or a maximum number of the plurality of first cells scheduled by the DCI to transmit at least one PUSCH;

wherein the plurality of first cells is determined for the at least one communication operation from a cell set according to the DCI;

wherein the cell set comprises a plurality of second cells determined according to a higher layer configuration;

wherein the cell set is selected from a plurality of cell sets according to the DCI;

wherein the first SCS configuration is different from a second SCS configuration for transmitting the DCI.

* * * * *